Aug. 18, 1931.                    E. G. RICE                    1,819,921

INTEREST CALCULATOR

Filed June 18, 1929

INVENTOR
*Elbert G. Rice*
BY
*Siggers + Adams*
ATTORNEYS

Patented Aug. 18, 1931

1,819,921

UNITED STATES PATENT OFFICE

ELBERT G. RICE, OF SEATTLE, WASHINGTON

INTEREST CALCULATOR

Application filed June 18, 1929. Serial No. 371,884.

This invention relates to calculators and among other objects aims to provide an improved device whereby interest may be readily determined for the period between two given dates using either the thirty day month system or the actual number of days.

In the drawings:—

Fig. 1 is a plan view of the device, and

Fig. 2 is a sectional view taken on the line 2—2 of Fig. 1.

Referring particularly to the drawings, the preferred embodiment of the invention is there shown as comprising a large fixed chart A and a small movable chart B each having certain indicia thereon adapted to cooperate with the indicia on the other.

In the present instance, the device is constructed and arranged to compute interest at 6% on 1,000; 2,000; 3,000; 4,000; 5,000; 6,000; 7,000; 8,000; and 9,000 for any period up to a year, and being capable of computing exact interest up to 360 days, but it is to be understood that it may be made to compute interest at any rate on any amount and for any period. Also, it may be used with equal facility to determine regular interest on the basis of thirty day months. On the face of the chart A is tabulated the interest on $1,000 to $9,000 for periods ranging from one day to 360 days in groups of 30 days each. The interest tabulations are shown as being arranged in vertical columns under the principals or amounts. For the sake of convenience, the columns of figures are divided into two groups, each covering a half year, one group being arranged on one side of the longitudinal center of the chart and the other group on the other side, simply to avoid making the chart unnecessarily long.

The first or left hand column C of figures represents the interest period or the number of elapsed thirty day months and days, the numbers from 1 to 30 also representing the due days of the months, while the columns D show the interest on $1,000; $2,000 and so on to $9,000.

The figures representing interest totals in the columns D are of course arranged in horizontal lines to the right of the numbers representing elapsed months and days in the columns C. For instance, at the lower left hand corner of the chart A the number 29.8333 in the first column to the right of 5—29 shows that $29.83 is the amount of interest due at 6% on $1,000 for 5—30 day months plus 29 days, or 179 days.

On the chart B and adjacent to its left hand edge, is a vertical column E of figures arranged numerically from 1 to 31. These figures are spaced apart the same distance as are the figures in the columns C and the top numeral or 1 is close to the top edge of the chart B. The figures in this column represent the "from" days of the month and those in the columns C the "to" or "due" dates. When using the device, the chart B is placed on the chart A with the left hand edge just to the right of columns C and with the "from" date (day of the month) in horizontal alinement with the "to" date.

In order to find the elapsed time between two dates and also the interest for that period, the chart B is provided with twelve vertical columns F of data. Each column is headed by the name of a month and following each name in vertical alinement are the names of the eleven successive months to complete a year. For example, the first column F reads from January to December, the second column would be from February to January, and so on to the last column, which would be from December to November. To the right of each of the names of the months in each column F is placed a figure corresponding to the number of that month with respect to the month at the head of its column. For example, in the first column, September is the eighth month following January. In the second column, June is the fourth month following February, etc.

In using the thirty day month system and knowing the relation of the two months and the "from" and "to" date, it is only necessary to place the "from" date in column E opposite to the proper "to" date in column C and the amount of interest is shown above the top edge of the chart B. Suppose it is desired to find the interest due on $1,000 at 6% from January 4 to December 19. Under the column F headed January on the chart B, it is found that December is the 11th month following January. The chart B is then placed on the chart A next to the 30 day group beginning with 11 and the 4 in column E is placed opposite to 19 in column C. Then at the top edge of the chart B in the column headed $1,000.00 is found $57.50 (Fig. 1.) In solving the above example, the chart B would be placed in the lower right hand corner opposite to the group marked 11. For reasons later to be described, the group of figures from 11—1 to 11—30 in the lower right hand corner of the chart A are duplicated above the group beginning 0—1 in the upper left hand corner and the group from 5—1 to 5—30 in the lower left hand corner is duplicated in the upper right hand corner above 6—1 (not shown.) One of the reasons is that as the groups are arranged for thirty day months, in figuring interest from a given date to the 31st of a month, it is necessary to place the "from" date in column E opposite to 1 in the month following the "to" date and should the number of elapsed months be 5 or 11, this could not be done unless the figures were arranged as shown. For example, suppose that it is desired to find the interest due on $3,000 at 6% from January 16 to December 31. Now, December is the eleventh month following January, so that the "to" date would be 11—31, but as there is no 11—31 on the chart A, the "from" date 16 would be placed opposite to 0—1 and at the upper edge of the chart B under the column $3,000 appears $172.50, the amount of interest due.

As before explained, the tabulated figures are given for thirty day months, so in order to find the actual number of days elapsed time and the accrued interest for that period, it is obvious that in some cases, one or more days would have to be added, while in other cases, one or more days should be subtracted. Therefore, in front of each of the months in the columns F is placed the number of days to be added to or subtracted from the "to" date to find the actual number of days. Thus, instead of the "from" date on chart B being placed opposite to the "to" date on chart A, it would be placed opposite to the number found by adding or subtracting the number designated in front of the particular month.

To find the interest due on $2,000 at 6% from January 20 to December 31. As pointed out in the previous example, December is the eleventh month, and there being no 11—31, the 20 in column E would ordinarily be placed opposite to 0—1. However, in front of December in the January column, it shows that four days should be added to find the actual elapsed time. Therefore, the 20 in column E is placed opposite to 0—5 (0—1+4) and at the top edge of the chart B, it is found that $115.00 is the interest due. Also, it shows that 11 months (of 30 days) and 15 days have elapsed, or 345 actual days.

Another reason for duplicating the group of figures 11—1 to 11—30 is that in figuring interest for slightly less than a year, say between days of the same month, but in different years, the "to" date would always be in the 0 group and the answer would always be found in the 11 group. For instance, to find the interest on $8,000 from January 31 to January 11, using the actual number of days, it is found in the January column that the chart B is to be used with the 0 group and that 5 days must be added. Therefore, 31 on the chart B is placed opposite to 0—11+5 or 0—16. Then, at the top edge of the chart it shows that 11 months (of 30 days) plus 15 have elapsed or 345 days and the interest is $460.00. The numbers 1000, 2000, etc., provided along the top edge of chart B are arranged in vertical alinement with the columns D so that it is not necessary to look at the top of the chart A to find the particular column desired.

If desired, the columns D may be arranged to show interest on one amount at different rates, as for example, the first column D (at the left) may indicate interest at 6% on $1000, the next column interest at 6½% on $1000, the next 7% on $1000, etc. Moreover, a number of charts similar to the large chart A may be provided each with figures showing different rates of interest and the small chart B could be applied to any of the large charts.

Obviously, the present invention is not restricted to the particular embodiment thereof herein shown and described.

What is claimed is:—

1. An interest calculator comprising in combination, a single chart sheet having vertical columns of tables representing the interest due on different principals; an associated vertical column of figures representing elapsed time in thirty day months and in days for the interest amounts; and a small chart freely movable over the large chart and having a vertical marginal column of numbers to represent a thirty-one day month, said numbers being spaced like the numbers representing elapsed time in months and days on the large chart, and the construction and arrangement being such that when a marginal number on the small chart, representing the day of the month from which the interest started to run, is placed adjacent to a number on the large chart representing the number of elapsed months and the day of the month the interest is due, the upper margin of the small chart will lie under a horizontal row of figures representing elapsed time on the basis of thirty day months and days and the actual interest on the different principals for that time.

2. An interest computing device of the character described, comprising a single chart sheet having vertical columns of interest tables for different principals; a marginal column of numbers showing the interest periods in different groups of thirty days each; and a small movable chart cooperating with the large chart having a marginal column of numbers at its left hand side representing thirty-one days, the arrangement of the marginal columns of numbers being such that when the day of the month when the interest period starts is brought opposite the day of the month when the interest is due, the upper edge of the small chart will come under a horizontal row of numbers giving the results on the basis of thirty day months.

3. An interest calculator comprising, in combination, a single chart sheet having vertical columns of data, one column representing elapsed time for different numbers of months plus one to thirty days and the other columns representing interest for the respective periods on different principals; a small movable chart having a vertical marginal column of numbers from one to thirty-one arranged to be placed adjacent to the column of numbers from one to thirty on the large chart; a series of columnar tabulations on the small chart showing the number of elapsed months between any two months of a year and also the number of days to be added or subtracted due to odd days in the months intervening, the from day of the months on the small chart being arranged to be placed adjacent an appropriate number representing the due day on the large chart in the thirty day group for the number of elapsed months; and the upper edge of the small chart being arranged to lie below a horizontal row of numbers representing the desired interest totals.

In testimony, that I claim the foregoing as my own, I have hereto affixed my signature.

ELBERT G. RICE.